UNITED STATES PATENT OFFICE.

STEPHEN M. ALLEN, OF DUXBURY, MASSACHUSETTS.

COMPOSITION OF MATTER RESEMBLING RUBBER.

SPECIFICATION forming part of Letters Patent No. 355,751, dated January 11, 1887.

Application filed April 20, 1886. Serial No. 199,499. (No specimens.)

*To all whom it may concern:*

Be it known that I, STEPHEN M. ALLEN, a resident of Duxbury, county of Plymouth, and State of Massachusetts, have invented a new and useful Composition of Matter Resembling Rubber, which invention is fully set forth in the following specification.

This invention has reference to the production of a substance, mixture, or composition of matter somewhat resembling rubber in certain respects, (in that it can be vulcanized, for example,) and capable of advantageous use in the production of a variety of articles.

In Letters Patent No. 337,472, granted to me March 9, 1886, I have described a mixture of resinous substance, animal or vegetable fiber, and non-volatile oil, which mixture can be molded under pressure into a solid coherent body.

My present invention may be regarded in some respects as an improvement upon the foregoing, and it is also useful for purposes similar to those specified in my Patents No. 278,481, dated May 29, 1883, and No. 284,794, dated September 11, 1883.

I have found that the character of the mixture is improved for many purposes by a preparatory treatment of the fiber in such way as to carbonize or gelatinize it. This may be accomplished for the purposes of the invention in many ways. Thus I may take wood pulp (preferably from resinous woods) and char it in a retort or partly-closed vessel, as in making charcoal, or I may mix the fiber with a sufficient quantity of animal or vegetable charcoal in powdered form. The desired result may be reached by chemical treatment of the fiber, as with sulphuric or other acid, or by application of animal gelatine, which permeates and fills the fibers. The wood fiber in this condition readily and perfectly unites with the asphalt, resin, or similar substance, which compound can be employed for many useful purposes, being rendered plastic and flexible to the required degree by the addition of more or less non-volatile oil, as described in my aforesaid Patent No. 337,472.

The pasty or plastic mass may, by addition of a suitable vehicle, (say linseed-oil,) be formed into a water-proof paint suitable for painting roofs, railroad-ties, posts, and for like purposes.

I have also found that the pasty mass formed as above specified can be vulcanized or cured by heat in the manner well understood in the manufacture of hard rubber, with or without the addition of sulphur or other materials customarily employed in that process.

The vegetable fiber compound may be mixed with animal fiber (from the skins, intestines, and other fibrous parts of animals) previously treated with animal gelatine, glycerine, animal oil, or fatty matter, and this mixture can be vulcanized at the ordinary temperature without injury to the animal fiber.

An important application of my present invention is to the manufacture of belting, packing, hose-pipe, and similar articles which employ a backing or foundation of textile fabric, such as canvas. In the manufacture of such articles the carbonized or gelatinized fiber mixed with the resinous or gummy matter is applied to or incorporated in the fabric. It may be united thereto by simple pressure, (evaporating out the volatile matters,) but preferably it is vulcanized, as in the manufacture of so-called "rubber belting," &c. The compound herein described can be vulcanized separately from the fabric, (though this is not preferred,) which is not possible with rubber belting and the like.

Having thus indicated the general nature and uses of my invention, I will describe in detail the manner in which the same may be carried into effect.

I take a suitable quantity—say one hundred pounds—of vegetable fiber—such as wood pulp—and carbonize or gelatinize it in any of the ways above indicated, or in any other suitable manner. It may be done conveniently and cheaply by soaking the fiber for about three hours in a twenty-five per cent. solution of sulphuric acid. It is then mixed with a hundred pounds (more or less) of asphalt or resinous or gummy matter, and with ten pounds (more or less) of a non-volatile oil, such as Trinidad asphalt-oil.

The proportions may of course be varied according to the purposes desired.

This compound may be heated sufficiently to drive off all moisture, and cooled and consolidated by molding under pressure into any desired shape.

The compound in its plastic or pasty condition can be vulcanized in the manner followed in the vulcanization of rubber. To produce belting or other article having a foundation of textile fabric, I preferably proceed by applying the pasty mass in such way that it will fill all the pores and interstices of the fabric, though of course it could be applied simply as a coating. I then vulcanize the whole in the usual way.

From what has already been pointed out it will be understood that the invention is capable of modification and variation within wide limits without departing from the principle thereof, and that some parts or steps of the invention may be employed without others.

Having thus described my said invention, what I claim herein is—

1. The moldable or plastic composition herein described, composed of carbonized or gelatinized fiber, asphalt, resin or equivalent substance, and non-volatile oil.

2. The vulcanizable compound described, consisting of fiber—such as wood pulp—carbonized or gelatinized, asphalt, resin or equivalent substance, and a suitable oil, substantially as set forth.

3. In the manufacture of a plastic composition containing fiber—such as wood pulp—the improvement consisting in carbonizing or gelatinizing said fiber, substantially as and for the purposes set forth.

4. As a new manufacture, belting or like article consisting of a foundation or backing of canvas or other fabric and a filling or coating of carbonized or gelatinized fiber and resin or like substance, substantially as described.

5. In the manufacture of belting, packing, and like articles, the improvement consisting in applying to or upon a suitable textile fabric a mixture containing the described carbonized or gelatinized fiber and resin or its equivalent and then vulcanizing the whole, as set forth.

In testimony whereof I have signed this specification in the presence of two subscribing witnesses.

STEPHEN M. ALLEN.

Witnesses:
ANNA C. GRANGER,
ALICE E. PINKHAM.